May 6, 1958 W. T. ENGEL 2,833,473
RECORD SENSING DEVICE
Filed April 21, 1954
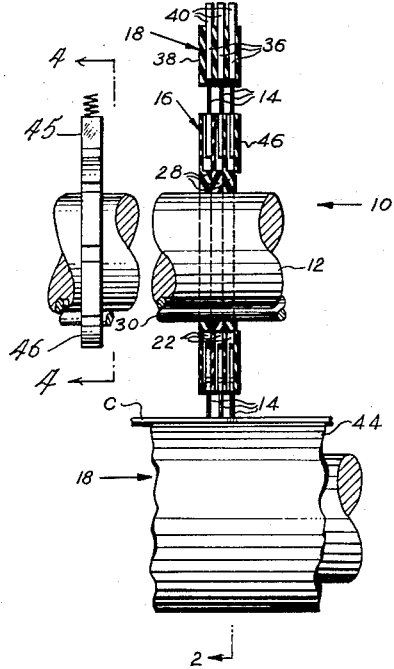
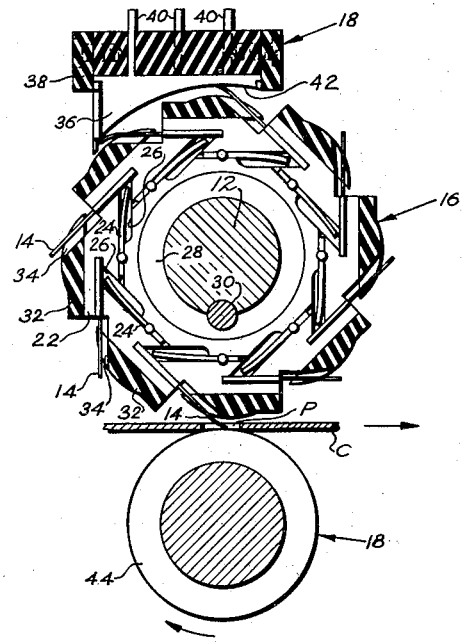
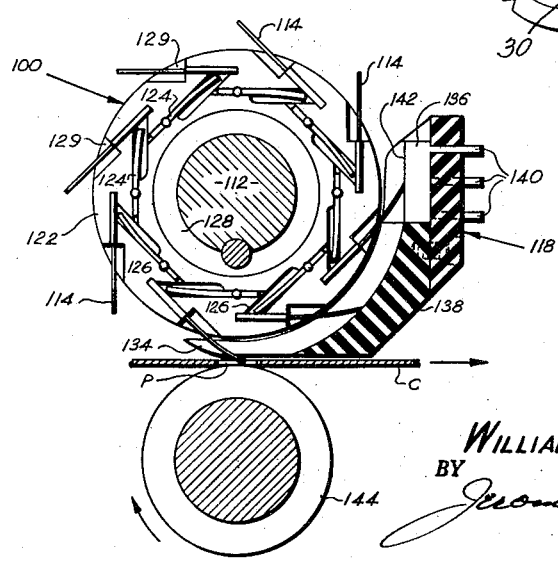
INVENTOR.
WILLIAM T. ENGEL
BY
ATTORNEY

United States Patent Office 2,833,473
Patented May 6, 1958

2,833,473

RECORD SENSING DEVICE

William T. Engel, Union, N. J., assignor to Burroughs Corporation, Detroit, Mich., a corporation of Michigan Application April 21, 1954, Serial No. 424,699

4 Claims. (Cl. 235—61.11)

The invention relates to sensing devices of the type which sense information or data contained in record media such as record cards or the like.

Business machines of the type with which the instant invention is concerned are generally operated in response to data or information contained in a data or information bearing medium. Although such data or information bearing medium may take many forms, the form most commonly in use is the well known record card. As the record card is fed into the machine it travels through a sensing section where the data or information contained in the record card is sensed. The information sensed by the sensing section is transmitted for analysis to an analyzing unit. Here the information is decoded, combined and supplied to the machine to be tabulated or recorded. Included in the sensing section are sensing devices. The present invention is concerned with improvements in the sensing devices.

Sensing devices usually include a sensing brush for sensing each column of information contained in the record card. The sensing brushes are positioned opposite to a coacting contact member. Whenever an electrical connection is made between the brushes and the contact member, an impulse is transmitted to an analyzer section for analysis. Thus, as a record card is fed through the sensing section, the solid portion of the card will break the connection between the brushes and the contact member. However, each time a hole or perforation appears in the aligned column of the record card, the brush will extend into the hole or perforation to make a connection with the contact member and to transmit a corresponding impulse to the analyzer.

It is well known in the art that the sensing brushes employed in business machines wear very rapidly. Because a sensing brush decreases in length as it becomes worn, the point along the contact member at which the sensing connection is made will vary with the wear of the brush. For efficient machine operation, worn brushes must be replaced. Frequent replacement of the sensing brushes presents an important problem because of the time consuming procedure and the resultant high costs involved in effecting the repairs.

An object of the present invention is to provide a novel sensing device which will enable a worn sensing brush to be replaced by a new brush without physically removing the old brush from the sensing device.

Another object of the present invention is the provision of a sensing device which may be operated to replace a worn sensing brush by a new brush without necessitating the removal of either the sensing device or the worn brush from the machine during each such replacement.

Still another object of the invention is to provide an improved sensing device in which there is contained a plurality of sensing brushes which are sequentially movable to sensing position.

In carrying out the foregoing objects, I provide a novel sensing device which includes as one of its features a brush holder which is rotatable to move a new brush into sensing position for replacing a worn sensing brush.

Another feature of the construction disclosed herein is the provision of novel means for enabling a worn brush which has been replaced to be utilized for supplying electric current to the new brush which replaces it.

Still another feature is the laminated construction of the brush holder which facilitates assembly and disassembly thereof.

Other objects and features of the invention will be pointed out in the following description and claims and illustrated in the accompanying drawings, which disclose, by way of examples, the principle of the invention and the best mode, which has been contemplated, of applying that principle.

In the drawings:

Fig. 1 is a front elevation of a sensing section composed of a number of sensing devices constructed in accordance with my invention, Fig. 2 is a side view of a sensing device shown in Fig. 1 taken along line 2—2.

Fig. 3 shows a modified sensing device.

Fig. 4 is a side view of a detent mechanism which may be used in conjunction with the illustrated sensing devices.

Referring to Fig. 1, there is shown a sensing section composed of three aligned sensing devices; Fig. 2 is a side view of one of the sensing devices. Identifying numeral 10 has been applied generally to the sensing devices shown in Figs. 1 and 2. Since each of the sensing devices 10 shown in Figs. 1 and 2 is a unitary structure capable of accomplishing the sensing function either individually or in combination with a number of aligned and similarly constructed sensing devices, the same numeral 10 will be employed to identify each such sensing device. In general, the sensing device 10 consists of a rotatably mounted shaft 12, a plurality of sensing brushes 14, a brush support, generally designated 16, and current conducting means, generally identified by the numeral 18.

The brushes 14 are each secured at their back ends in a slot (not numbered) in the conductive lamination 22 of the brush holder 16. To securely retain each of the brushes 14 in the lamination 22 a securing leaf spring 24 is suitably fastened to the lamination in a slot 26. The slot 26 is positioned at a predetermined angle so that the tip of the leaf spring 24 may wedge against the rear of the brush 14 when the rear end of the brush is inserted into its slot.

A non-conductive lamination 28, comprising the insulated part of the brush holder 16, is L-shaped in cross-section, see Fig. 1. The horizontal leg of the lamination 28 is directly and non-rotatably mounted on the rotatable shaft 12, as by key 30. The vertical portion of the lamination 28 extends radially outward to an irregular periphery formed by finger-like, radially spaced comb bodies 32, see Fig. 2. Lamination 22 is secured to the lamination 28 against the vertical portion which covers one side of the lamination 22 and between the hub and comb bodies of the lamination 28. Brushes 14, extending from the periphery of the lamination 22, are laterally guided by the combs 34 formed on the comb bodies 32.

The current conducting means, generally identified by the numeral 18, is positioned both above and below the brush housing 16. The part of the current conducting means 18 positioned above the brush housing 16 comprises a conducting member 36 which is mounted in an insulating mounting 38. Connector 40 of the member 36 extends from the mounting 38 for connection to a source of current. Member 36 is made sufficiently long at its brush contacting surface 42 to insure contact with at least one of the brushes 14 at all times and in all positions of the brush holder 16. Positioned below the brush housing 16 is the brush contact member 44 which is connected to the source of current and to the analyzer, not shown. In the drawings, the contact member 44 is shown in the form of a roller which rotates in a predetermined timed relationship with the operation of the machine. It is to be understood that the illustrated roller 44 is not limiting. Any other suitable contact arrangement or element for transmitting information or data may be employed. During the course of sensing, current is transmitted from the conducting member 36, to a brush 14 in contact with the surface 42, to the conductive lamination 22 and then to all the brushes 14 peripherally mounted therein. Contact between the bottommost brush 14 (the brush in sensing position), and the member 44 completes a sensing circuit.

Normally, when there is no record card C being fed through the machine the brush 14, in sensing position, will be in contact with the rolling contact member 44. When a card C is fed through the machine and into the sensing unit it lifts the sensing brush 14 from its connection with the member 44. As the record card C passes through the sensing unit, if a hole or perforation P should appear therein, the lifted brush 14 will drop into the confines of the hole P to make contact with member 44. At the time of such contact a signal is transmitted to the analyzer, mentioned before.

After a period of use the brush 14, in sensing position, becomes worn and must be replaced. Replacement of the worn brush 14 by a new brush is accomplished by rotating the shaft 12 or holder 16 clockwise, see Fig. 2. The worn brush 14 is then rotated out of sensing position and it is replaced by a new brush 14. A suitable detent means, shown best in Fig. 4, may be employed to properly position the shaft 12 or holder 16 so that the new brush 14 will assume the proper sensing position. This detent means may consist simply of a spring-urged pawl or detent 45 cooperating with a notched disc 46 which is secured to the shaft 12 by the key 30.

After a period of time many of the brushes 14 positioned about the periphery of the brush holder will have been worn and replaced by new brushes. This, however, will not affect the operation of the sensing device. The worn brushes 14, moved from sensing position, are still long enough, and the conducting member 36 is set close enough to the holder 16 to enable the worn brushes to conduct the current from member 36 to the new brush in sensing position. Thus the sensing device 10 is usable until the very last brush 14 is worn to the point when it must be replaced.

Replacement of worn brushes is a simple procedure. As noted previously, only one of the sensing devices 10 has been described. Because all the sensing devices 10 are similar they may be combined or laminated with others to make up a sensing section or unit as shown in Fig. 1, or each of them may be used individually. However, in practice a number of sensing devices 10 are stacked or laminated alongside each other, to form a unit as shown in Fig. 1. When the devices 10 are combined to form a sensing section or unit the brush holders 16 are axially aligned on the shaft 12 so that there are a plurality of sensing brushes 14 which are axially aligned in sensing position and a plurality of sensing brushes 14 which are axially aligned in non-sensing position. The lamination 28 of each sensing device 10, when stacked to form the sensing unit, provides the enclosing side for the open side of the next adjacent sensing device. When the desired number of sensing devices 10 are laminated or stacked together to form the sensing unit, an end cover plate 46 (see Fig. 1) is secured over the open side of the last sensing device.

Thus, to replace the worn brushes 14, the sensing devices 10, including shaft 12, may be removed from the machine as a unit and each of the sensing devices then removed from the shaft. There are then two alternatives, either new sensing devices are mounted in place of those removed or the worn brushes in the removed housings 16 are replaced by new ones. If the latter alternative is chosen, the worn brushes 14 may be removed from the lamination 22 merely by lifting the wedging tip of the spring 24 away from the rear of the brush. Access to the spring is afforded since there is no restricting cover on one side of the lamination 22 once, either the plate 46 is removed or the adjacent sensing device 10 is taken away. Once the worn brushes 14 are removed from the holding lamination 22, new brushes 14 may be substituted in their places and the unit, including shaft 12, may be reinserted into the machine.

A modified sensing device 100 is shown in Fig. 3. A large portion of the structure of the sensing device 100 is the same as that shown in Figs. 1 and 2. The basic difference lies, however, in the comb structure for guiding the sensing brushes. In Fig. 3 brushes 114 are securely mounted in the conductive lamination 122 by the wedging spring 124. In this modification exactly the same manner of securing the brushes 114 to the conductive lamination 122 is employed as described in sensing device 10 of Figs. 1 and 2. Conductive lamination 122 is fixed about the hub of the non-conductive member 128 and it is spaced thereby from the shaft 112.

The non-conductive laminated member 128 has a radially extending wall 129 whose diameter coincides with that of the conductive member 122. When the conductive lamination 122 is mounted on the hub of the member 128 it is insulated from the hub by the shaft 112 and on its one side, from the next adjacent sensing device 100 by the radial wall 129. At this point it will be noted that unlike non-conductive member 28 of the device 10 shown in Figs. 1 and 2, the non-conductive member 128 of the device 100 of Fig. 3 does not have an individual comb to guide each of the brushes 114; however, the wall 129 does serve as a horizontal guide for the brush 114. In this regard it will be seen that the wall 129 is continuous and thereby serves as a guide in the horizontal direction for the brush 114 which extends peripherally outward from the notched member 128.

Sensing device 100 has an arcuate comb 138 independent of the members 122 and 128 to guide the brushes 114 from the time they come into contact with the current conductive member 136 of the current conducting means 118 and up to the sensing position. Connectors 140 extend from the members 136 out of the housing 138 to a suitable source of current. Contact member 144, also connected to the source of current, completes the circuit from member 136, the brushes in contact with the surface 142 of the member 136, the conductive member 122 and the brush 114 in sensing position.

The operation of the sensing brush 114 as a record card C passes between it and the contact member 144 is exactly the same as that described for the sensing device 10 shown in Figs. 1 and 2. The procedure for moving a worn brush 114 from the sensing position and replacing it by a new one is also the same. Here too replacement of the whole sensing device 100 by a new one or by merely removing the worn brushes 114 and substituting new ones in their place is the same as that described for the sensing device 10.

From the foregoing it will be clear that applicant has provided a sensing device which has a longer useful life than those heretofore known. Its simple construction enables repairs to be made inexpensively and rapidly and moreover, allows for the replacement of a worn sensing brush without the necessity of physically removing the worn brush from the sensing device during each such replacement.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit as indicated by the scope of the claims appended hereto.

The invention is claimed as follows:

1. In a sensing device adapted to sense data representations in a given column of a record, a plurality of sensing elements adapted for selective serial movement into the same sensing position, means for moving all of said elements concurrently to place any selected one of said elements in a position for sensing data representations in the record and to place the other sensing elements in positions where they cannot sense the record, and means for retaining all of said sensing elements in stationary positions while the data representations are being sensed by said selected one sensing element.

2. In a sensing device adapted to sense data representations contained in a given column of a moving record medium, a first sensing brush, a second sensing brush, means for stationarily retaining said sensing brushes in positions where said first sensing brush engages the record medium and said second sensing brush is disengaged from the record medium, and means for moving said first sensing brush out of engagement with the record medium while moving said second sensing brush into engagement with the record medium.

3. In a sensing device adapted to sense data representations contained in a given column of a moving record medium, a brush holder rotatable about a stationary axis, detent means for stationarily retaining said brush holder in any selected one of a plurality of angular positions to which said holder may be adjusted, and a plurality of sensing brushes mounted in circumferentially spaced relation on said brush holder so that a respective one of said brushes is positioned to engage the record medium for each of said angular positions of said holder.

4. In a sensing device adapted to sense data representations contained in a given column of a moving record medium, a brush holder rotatable about a stationary axis, detent means for stationarily retaining said brush holder in any selected one of a plurality of angular positions to which said holder may be adjusted, a plurality of sensing brushes electrically coupled to each other mounted in circumferentially spaced relation on said brush holder so that a respective one of said brushes is positioned to engage the record medium for each of said angular positions of said holder, and a source of potential coupled through a non-selected one of said brushes to said selected brush.

References Cited in the file of this patent

UNITED STATES PATENTS

| | | |
|---|---|---|
| 1,236,482 | Powers | Aug. 14, 1917 |
| 2,238,873 | Nelson, Jr. | Apr. 15, 1941 |
| 2,265,440 | Maul | Dec. 9, 1941 |
| 2,335,928 | Ford | Dec. 7, 1943 |